United States Patent Office 2,945,013
Patented July 12, 1960

2,945,013

WATER-SOLUBLE INTERPOLYMERS OF ACRYLIC ACIDS AND 2-ETHYLHEXYL ESTERS OF ACRYLIC ACIDS AND METHOD OF MAKING SAME

John B. Ott, Northampton, Mass., assignor to Monsanto Chemical Company, St. Louis, Mo., a corporation of Delaware No Drawing. Filed Mar. 22, 1956, Ser. No. 573,069

8 Claims. (Cl. 260—86.1)

The present invention relates to water-soluble interpolymers and more particularly water-soluble interpolymers of acrylic acids and the 2-ethylhexyl esters of such acrylic acids.

It is an object of this invention to provide certain novel and highly valuable water-soluble interpolymers.

Another object of this invention is to provide methods for preparing such novel water-soluble interpolymers.

Other objects and advantages of this invention will become apparent from the following detailed description thereof.

There is provided by this invention a novel and highly useful class of water-soluble interpolymers which consist of 93.5–98.5 mol percent of an acidic monomer of the group consisting of acrylic acid, methacrylic acid and mixtures thereof, and, correspondingly, 6.5–1.5 mol percent of a monomer of the group consisting of 2-ethylhexyl acrylate, 2-ethylhexyl methacrylate and mixtures thereof. The interpolymers of this invention have utility in many diverse industrial fields as subsequently set forth herein in greater detail.

The following examples are set forth to illustrate more clearly the principle and practice of this invention to those skilled in the art. All parts are by weight.

EXAMPLE I

Thirty parts of a monomer mixture containing 94 mol percent acrylic acid and 6 mol percent of 2-ethylhexyl acrylate, 120 parts of 1,2-dichloroethane and 0.1 part of benzoyl peroxide are charged to a glass reaction vessel. The atmosphere in the reaction vessel is swept free of oxygen with dry nitrogen gas and 10 parts per million of sulfur dioxide (based on the monomers) are charged to the system. The reaction vessel is sealed and rotated end over end at 50° C. for 76 hours. The interpolymer is recovered in a quantitative yield and has a specific viscosity of 4.3 as determined in a 1% solution in water at 25° C. Hereafter, whenever specific viscosities are mentioned, it will be understood that the values reported were determined in a 1% solution in water at 25° C.

EXAMPLE II

Example I is repeated except that the monomer mixture employed consists of 97 mol percent of acrylic acid and 3 mol percent of 2-ethylhexyl acrylate. The interpolymer is obtained in a quantitative yield and has a specific viscosity of 4.4.

EXAMPLES III–XVIII

Several interpolymers are prepared by charging 30 parts of a monomer mixture consisting of acrylic acid and 2-ethylhexyl acrylate, 0.1 part of lauroyl peroxide and varying quantities of 1,2-dichloroethane to a glass reaction vessel. The reaction systems are heated to 50° C. for 72 hours while rotating the reaction vessel end over end. The parts of solvent employed and the specific viscosities of the products obtained are set forth in Table I. Minor variations in the materials employed in Examples XVII and XVIII are described in the footnotes of Table I.

Table 1

| Example | Monomer Charge | | Parts Solvent | Specific Viscosity of Product, 1% in $H_2O$ at 25° C. |
|---|---|---|---|---|
| | Mol Percent Acrylic Acid | Mol Percent 2-Ethylhexyl acrylate | | |
| III | 98.5 | 1.5 | 120 | 5.1 |
| IV | 98.0 | 2.0 | 120 | 5.4 |
| V | 97.5 | 2.5 | 120 | 5.8 |
| VI | 97.0 | 3.0 | 120 | 4.4 |
| VII | 96.5 | 3.5 | 120 | 4.5 |
| VIII | 96.0 | 4.0 | 120 | 4.4 |
| IX | 95.8 | 4.2 | 120 | 4.2 |
| X | 95.3 | 4.7 | 120 | 4.3 |
| XI | 95.0 | 5.0 | 120 | 4.1 |
| XII | 94.5 | 5.5 | 120 | 4.1 |
| XIII | 98.0 | 2.0 | 150 | 4.3 |
| XIV | 97.5 | 2.5 | 150 | 4.1 |
| XV | 97.0 | 3.0 | 150 | 3.3 |
| XVI | 96.5 | 3.5 | 150 | 4.0 |
| XVII [1] | 95.5 | 4.5 | 70 | 5.7 |
| XVIII [1,2] | 95.5 | 4.5 | 70 | 6.7 |

[1] Benzoyl Peroxide used as catalyst.
[2] Benzene used as solvent.

EXAMPLE XIX

Thirty parts of a monomer mixture consisting of 95.5 mol percent of acrylic acid and 4.5 mol percent of 2-ethylhexyl methacrylate, 0.1 part of lauroyl peroxide and 150 parts of 1,2-dichloroethane are charged to a glass reaction vessel. The polymerization is effected by heating the reaction mixture to 50° C. for 72 hours while rotating the reaction vessel end over end. The interpolymer is obtained in a quantitative yield and has a specific viscosity of 2.0.

EXAMPLE XX

Example XIX is repeated except that only 120 parts of 1,2-dichloroethane are employed and 0.1 part of azoisobutyronitrile is employed in lieu of lauroyl peroxide as the polymerization catalyst. The product has a specific viscosity of 4.3.

EXAMPLE XXI

Thirty parts of a monomer mixture consisting of 95.5 mol percent acrylic acid and 4.5 mol percent of 2-ethylhexylacrylate, 0.1 part of benzoyl peroxide and 120 parts of 1,2-dichloroethane are charged to a stirred, glass-lined reactor. The reaction mixture is heated to 50° C. for 1 hour with stirring. At the end of this time the reaction mixture is virtually unstirrable due to the presence of precipitated interpolymer. Stirring and heating at 50° C. is continued for another 3½ hours during which time an additional 30 parts of 1,2-dichloroethane are added to the reaction flask as needed to maintain the reaction mass in a stirrable condition. The interpolymer is obtained in the yield of 94% and has a specific viscosity of 2.8.

EXAMPLE XXII

PART A

Into the reaction vessel described in Example XXI are charged 250 parts of a monomer mixture consisting of 95.5 mol percent acrylic acid and 4.5 mol percent 2-ethylhexyl acrylate, 2.5 parts of lauroyl peroxide and 750 parts of 1,2-dichloroethane. The reaction mixture is heated to 50° C. with stirring. At the end of 1½ hours the reaction mixture is too viscous to stir and an additional 400 parts of 1,2-dichloroethane are added to the reaction mixture over the next three hours as required to maintain the reaction mixture in a stirrable condition. The interpolymer is obtained in substantially quantitative yield and has a specific viscosity of 3.9.

In this part of the Example it will be observed that the initial ratio of solvent to monomers is 3/1 and the overall ratio of solvent to monomers at the end of the reaction is 4½/1.

PART B

Part A of this Example is repeated except that initially 1000 parts of 1,2-dichloroethane are charged to the reaction vessel. As in part A, at the end of 1½ hours the reaction mixture is too viscous to stir and an additional 400 parts of 1,2-dichloroethane are added to the reaction mixture during the final three hours of the run. The interpolymer is obtained in substantially quantitative yield and has a specific viscosity of 2.9.

In this part of the example it will be noted that the original ratio of solvent to monomers is 4/1 and the overall ratio of solvent to monomers at the end of the reaction is 5½/1.

EXAMPLES XXIII–XXVI

Example V is repeated and three additional polymerizations are carried out which differ therefrom only in that a mixture of 1,2-dichloroethane and carbon tetrachloride is employed as the reaction medium. The solvent mixtures employed and the specific viscosities of the interpolymers are set forth in Table II.

*Table II*

| Example | Solvent Composition | | Specific Viscosity of Product, 1% in H$_2$O at 25° C. |
|---|---|---|---|
| | Parts EDC[1] | Parts CCl$_4$ | |
| XXIII | 120 | | 5.8 |
| XXIV | 108 | 12 | 3.6 |
| XXV | 90 | 30 | 2.6 |
| XXVI | 60 | 60 | 2.5 |

[1] 1,2-dichloroethane.

EXAMPLE XXVII

Example XXI is repeated except that hexane is employed as the reaction medium in lieu of 1,2-dichloroethane. The interpolymer obtained has a specific viscosity of 1.3.

EXAMPLE XXVIII

Example XXI is repeated except that methacrylic acid is employed in lieu of acrylic acid in the monomer mixture. The interpolymer is obtained in a yield of 82% and has a specific viscosity of about 0.2.

EXAMPLE XXIX

Example XIX is repeated except that the monomer mixture employed consists of 98.5 mol percent of methacrylic acid and 1.5 mol percent of 2-ethylhexyl methacrylate. The interpolymer is obtained in a quantitative yield and has a specific viscosity of about 0.3.

The products of this invention are water-soluble interpolymers of an acidic monomer selected from the group consisting of acrylic acid, methacrylic acid, and mixtures thereof and a monomer selected from the group consisting of 2-ethylhexylacrylate, 2-ethylhexyl methacrylate and mixtures thereof. For purposes of this invention the interpolymers are considered to be water soluble if 0.5 part of the interpolymer will dissolve in 99.5 parts of water at 25° C. For reasons of cost, interpolymer properties, and ease of interpolymer preparation, the preferred compounds of this invention are interpolymers of acrylic acid and 2-ethylhexyl acrylate.

The interpolymers of the invention contain 1.5–6.5 mol percent and preferably 2.0–5.0 mol percent of the 2-ethylhexyl ester with the balance of the interpolymer being the acidic monomer. The properties of the interpolymers are influenced most importantly by:

(1) The particular acidic monomer included in the interpolymer, and (2) The molar proportions of the acidic monomer and the 2-ethylhexyl ester included in the interpolymer. In general, the interpolymers containing methacrylic acid as the acidic monomer are less water soluble than otherwise comparable interpolymers containing acrylic acid as the acidic monomer. In applications where the balance between the hydrophobic and hydrophilic properties of the interpolymer are important, interpolymers containing methacrylic acid as the acidic monomer should contain a smaller molar proportion of the 2-ethylhexyl ester than otherwise comparable interpolymers containing acrylic acid as the acidic monomer.

Variation in the molar ratio of the acidic monomer to the 2-ethylhexyl ester contained in the interpolymer affects the balance between the hydrophobic and hydrophilic properties in the interpolymers. This effect is not pronounced but can be observed, particularly where the interpolymers are employed as dispersing agents in the suspension polymerization of styrene and vinyl chloride.

For most purposes, the properties of the interpolymers appear to be affected but slightly by wide variations in molecular weight. The preferred interpolymers of this invention have specific viscosities of at least about 0.1 when methacrylic acid is the acidic monomer included in the interpolymer and at least about 0.8 when acrylic acid is the acidic monomer included in the interpolymer. Both of the above-noted specific viscosities are determined in 1% solutions in water at 25° C. in accordance with the well-known formula:

$$\text{Specific Viscosity} = \frac{\text{Solution Viscosity} - \text{Solvent Viscosity}}{\text{Solvent Viscosity}}$$

The interpolymers of this invention may be prepared by admixing a mixture of the two monomers with a free-radical generating polymerization initiator and heating the mixture to a temperature at which the initiator decomposes to form free radicals. Such polymerizations can be carried out by heating the monomers en masse or preferably by first dissolving the monomers in a suitable solvent. In particular, it is preferred to prepare the interpolymers employing a solvent/non-solvent polymerization system, i.e., carrying out the polymerization in an organic liquid that is a solvent for the monomers but a non-solvent for the interpolymer. Typical of the liquids that may be employed as solvents for the polymerization reaction are aliphatic hydrocarbons such as hexane, pentane, octane, petroleum ethers boiling in the range of 50–125° C.; aromatic hydrocarbons such as benzene, toluene, xylene, ethylbenzene; chlorinated hydrocarbons such as chlorobenzene, 1,2-dichloroethane, chloroform, carbon tetrachloride; etc. Typical of the free-radical generating polymerization initiators that may be employed in the preparation of the interpolymers are benzoyl peroxide, lauroyl peroxide, ditertiary butyl peroxide, oleyl peroxide, toluyl peroxide, and the like.

The molecular weight of the interpolymers of the invention can be controlled by making suitable adjustments in the polymerization process employed in their preparation. As illustrated in Examples XXIII–XXVI, cf. Table II, addition of carbon tetrachloride to 1,2-dichloroethane under otherwise identical conditions will lower the molecular weight (as measured by specific viscosity) of the interpolymer. The molecular weight of the interpolymer also is influenced by the ratio of solvent to monomers employed in solution polymerizations with lower molecular weights being obtained as the ratio of solvent to monomers is increased under otherwise identical conditions. Compare the specific viscosities of the interpolymers obtained in Examples IV through VII with the specific viscosities obtained in corresponding Examples XIII through XVI. It will be noted that the only difference between these two series of polymerizations is the parts of solvent employed. A similar trend is noted in Parts A and B of Example XXII which differ only in the quantity of solvent employed for a given monomer charge. Here again an interpolymer of lower molecular weight is obtained when the ratio of solvent to monomers is increased. To obtain interpolymers of high molecular weight, the monomer charge should be dissolved in a minimum quantity of reaction solvent, e.g., in an equal weight of the reaction solvent. As the polymerization proceeds, small additional quantities of reaction solvent should be charged to the polymerization vessel as required to maintain the reaction mass in a stirrable condition.

The interpolymers of this invention have utility in many diverse industrial fields. They are sizing agents for filament yarns, particularly nylon. They function as flocculating agents for solids suspended in aqueous solutions and may be employed in beer and soft drink manufacturing processes, in sugar-refining, in sewerage treatment, etc. A major field of application for these interpolymers is as dispersing agents in the aqueous suspension polymerization of vinyl chloride and styrene. The use of these interpolymers as dispersing agents in such polymerization processes is disclosed more fully in my copending applications, Serial No. 573,068, now U.S. 2,862,912, and Serial No. 573,074, now abandoned, both filed of even date herewith. The descriptions of these two copending applications are incorporated herein by reference.

The above descriptions and particularly the examples are set forth for purposes of illustration only. Many other modifications and variations thereof will be apparent to those skilled in the art and can be made without departing from the spirit and scope of the invention herein disclosed.

What is claimed is:

1. Water-soluble interpolymers consisting of 93.5–98.5 mol percent of an acidic monomer of the group consisting of acrylic acid, methacrylic acid and mixtures thereof and, correspondingly, 6.5–1.5 mol percent of a monomer of the group consisting of 2-ethylhexyl acrylate, 2-ethylhexyl methacrylate and mixtures thereof.

2. Water-soluble interpolymers consisting of 95.0–98.0 mol percent of an acidic monomer of the group consisting of acrylic acid, methacrylic acid and mixtures thereof and, correspondingly, 5.0–2.0 mol percent of a monomer of the group consisting of 2-ethylhexyl acrylate, 2-ethylhexyl methacrylate and mixtures thereof.

3. A water-soluble interpolymer consisting of 93.5–98.5 mol percent of acrylic acid and, correspondingly, 6.5–1.5 mol percent of 2-ethylhexyl acrylate.

4. A water-soluble interpolymer consisting of 95.0–98.0 mol percent of acrylic acid and, correspondingly, 5.0–2.0 mol percent of 2-ethylhexyl acrylate.

5. A water-soluble interpolymer consisting of 93.5–98.5 mol percent of acrylic acid and, correspondingly, 6.5–1.5 mol percent of 2-ethylhexyl methacrylate.

6. A water-soluble interpolymer consisting of 93.5–98.5 mol percent of methacrylic acid and, correspondingly, 6.5–1.5 mol percent of 2-ethylhexyl acrylate.

7. A water-soluble interpolymer consisting of 93.5–98.5 mol percent of methacrylic acid and, correspondingly, 6.5–1.5 mol percent of 2-ethylhexyl methacrylate.

8. The method for preparing the water-soluble interpolymers of claim 1 which comprises dissolving a monomer mixture consisting of 93.5–98.5 mol percent of an acidic monomer of the group consisting of acrylic acid, methacrylic acid and mixtures thereof and, correspondingly, 6.5–1.5 mol percent of a monomer of the group consisting of 2-ethylhexyl acrylate, 2-ethylhexyl methacrylate and mixtures thereof in at least an equal weight of a solvent for the monomer mixture, incorporating a free-radical generating polymerization initiator in said mixture of monomers and organic liquid and heating the reaction mixture to a temperature at which free radicals are generated, said solvent being selected from the group consisting of aliphatic hydrocarbons, aromatic hydrocarbons, and chlorinated hydrocarbons.

References Cited in the file of this patent

UNITED STATES PATENTS

| | | |
|---|---|---|
| 2,289,540 | Dittmar et al. | July 14, 1942 |
| 2,726,230 | Carlson | Dec. 6, 1955 |
| 2,765,228 | Jordan | Oct. 2, 1956 |
| 2,765,229 | McLaughlin | Oct. 2, 1956 |

FOREIGN PATENTS

| | | |
|---|---|---|
| 478,323 | Great Britain | Jan. 17, 1938 |
| 517,123 | Great Britain | Jan. 22, 1940 |
| 532,308 | Great Britain | Jan. 22, 1941 |
| 570,837 | Great Britain | July 25, 1945 |
| 584,857 | Great Britain | Jan. 24, 1947 |

OTHER REFERENCES

Modern Plastics, volume 24, page 147 (August 1947).

Schildknecht: "Vinyl & Related Polymers" (1952), published by John Wiley & Sons, Inc., New York, pages 297–301.